Oct. 23, 1956    G. VANDE SANDE    2,767,910

RELAY BINARY COUNTER

Filed Jan. 28, 1953

*INVENTOR.*
G. VANDE SANDE
*BY*
Forest B. Hitchcock
HIS ATTORNEY

United States Patent Office 2,767,910
Patented Oct. 23, 1956

2,767,910

RELAY BINARY COUNTER

George Vande Sande, Greece, N. Y., assignor to General Railway Signal Company, Rochester, N. Y.

Application January 28, 1953, Serial No. 333,758
4 Claims. (Cl. 235—61)

This invention relates to a relay binary counter, and more particularly pertains to a counter effective both to add or subtract counts in response to respective add or subtract inputs.

Binary type relay counters of the kind comprising a plurality of cascade-connected input dividing stages are well-known in the art. The binary counter of this invention is of this general type but is so organized that it is capable of adding a count for each input received from one source and subtracting a count for each input received from a different source. The relay binary counter of this invention is useful, therefore, whenever a cumulative total of any kind of units is required under conditions where such units are both being added to and subtracted from the total. For example, in a hump yard scale controlling system, it is desirable that a running total be kept of the number of cars actually occupying the track scale under conditions where cars may at random be both entering and/or leaving the scale, thereby causing additional counts to be respectively added or subtracted. Such a system is disclosed in the prior application of Vande Sande and Wynn, Ser. No. 283,102, filed April 18, 1952, of which this sole application is a continuation in part. Such prior application discloses in its Fig. 2B a two stage binary relay counter; whereas, this application discloses a three stage binary relay counter. All subject matter relating to such a counter which is common to these two applications is claimed in this application.

It is, therefore, an object of this invention to provide a binary add-subtract counter comprising a plurality of neutral type relays.

It is another object of this invention to provide a binary counter capable of both adding and subtracting input counts and having a counting capacity of $2^n-1$ input counts with $2n$ relays.

Other objects, purposes and characteristic features of this invention will in part be obvious from the accompanying drawings and in part pointed out as the description of this invention progresses.

In the detailed description of this invention, reference will be made to the accompanying drawings in which.

Figures 1, 2:
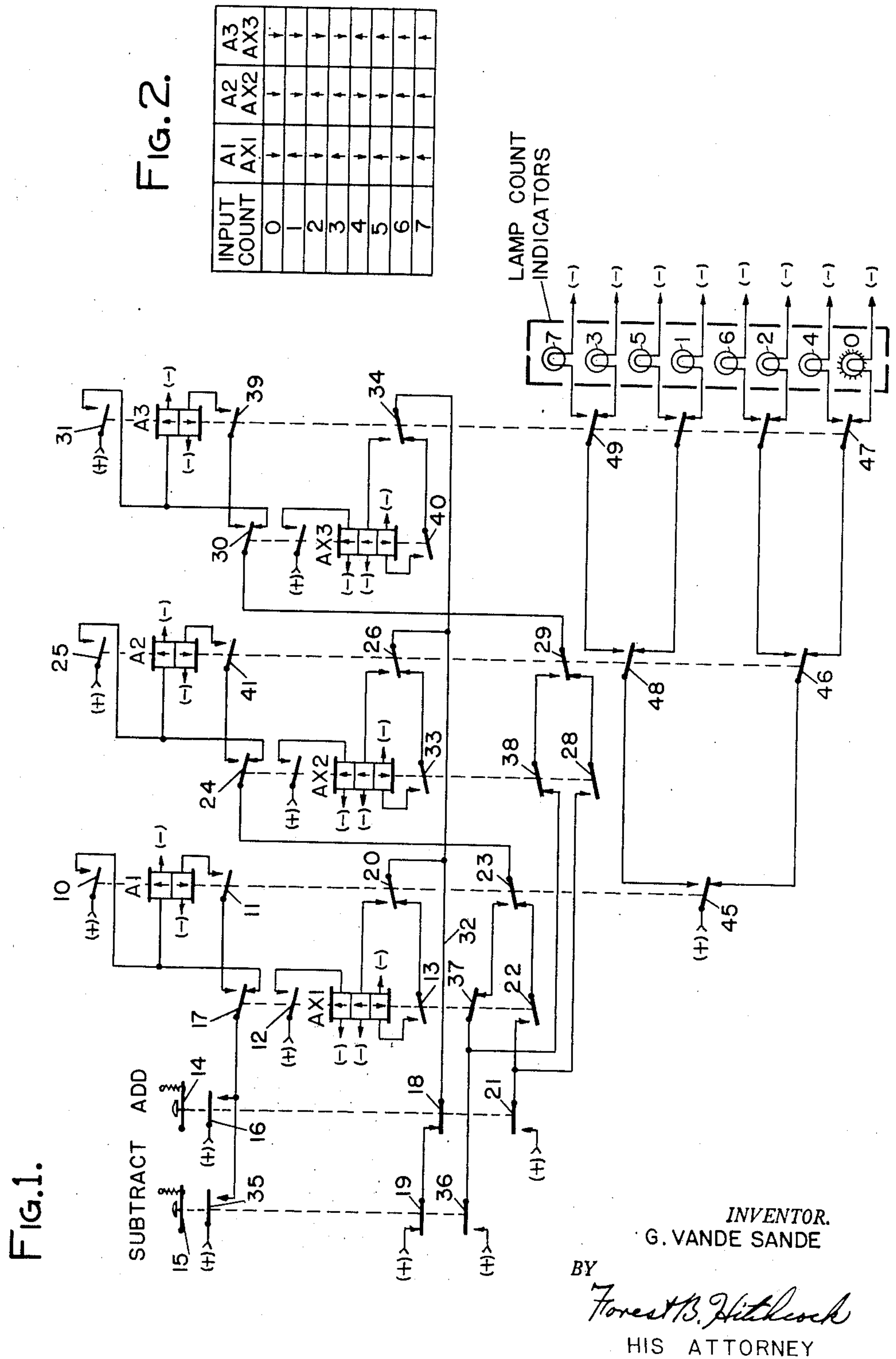
Fig. 1 is a circuit drawing of the binary counter of this invention.
Fig. 2 is a code chart illustrating the conditions of the various counting relays for the different counts registered on the counter.

To simplify the illustration and facilitate in the explanation of this invention, the various relays have been shown diagrammatically and conventional illustrations have been used so as to make it easy to understand the principles and manner of operation rather than to illustrate the specific construction and arrangement of parts that would be used in practice. The various relays and their contacts are shown in a conventional manner, and symbols are used to indicate connections to the terminals of batteries or other sources of electric current instead of showing all the wiring connections to these terminals. The symbols (+) and (−) are used to indicate the positive and negative terminals respectively of a suitable source of direct current for operating the various relays.

Described briefly, the binary counter of this invention comprises a plurality of input dividing stages each of which includes two neutral-type relays. Each stage after the first may be considered as receiving its input from the preceding stage; the first stage receives its input from the respective add and subtract input sources which, as will be shown, may comprise push-button contacts.

Each binary stage has two stable distinctive conditions. One of these conditions is that wherein both the relays of that stage are picked up; the other condition is that wherein both these relays are dropped away. If a succession of counts is received, either for adding to or subtracting from the total already supplied to the counter, the first stage operates from one of its conditions to the other in response to each of such input counts; the second stage operates from one of its conditions to the other in response to each second operation of the first stage; and the third binary stage operates in response to every second operation of the second stage from which it receives its input, and so on with respect to the succeeding stages which may be provided according to the counting capacity desired.

According to the principles of this invention, each input count, regardless of whether it is an add or subtract count, causes the first binary stage to be operated to its opposite condition. With respect to the remaining binary stages, however, the addition of a count brings about operation of any binary stage after the first only when such added count is effective to cause the relays of the preceding stage to drop away. Conversely, the subtraction of a count results in the operation of any binary stage after the first only when such added count is effective to cause the relays of the preceding stage to pick up.

In Fig. 1, the relays of the first binary stage are designated as A1 and AX1, the relays for the second stage are designated A2 and AX2 and so on for all additional stages that may be provided. All of the counting relays are neutral-type relays. The upper of the two relays included in each binary stage such as the relays A1, A2, and A3 is preferably a two winding relay. Energization of the upper winding causes the relay to pick up, and when this occurs a stick circuit is closed through the front contact of such relay as typified by the front contact 10 of relay A1, to thereby hold the relay energized and its armature picked up. Energization of the lower winding through a front contact of the relay such as front contact 11 of relay A1 results in the creation of a magneto-motive force having a polarity which opposes that resulting from energization of the upper winding through its stick circuit so that the relay drops away.

The lower relay of each binary stage such as the relays AX1, AX2, and AX3 are also neutral-type relays and are preferably provided with three windings. When the center winding of the relay is energized, the relay is picked up. A stick circuit is then immediately completed through a front contact of this relay such as through front contact 12 of relay AX1 to thereby energize the upper winding and maintain the relay energized. Energization of the lower winding of the relay through its front contact such as front contact 13 of relay AX1 results in the establishing of a magneto-motive force which opposes that resulting from energization of the upper winding by its stick circuit, thereby causing the relay to quickly drop away. Add and Subtract push-button contactors 14 and 15 are provided, and each operation of such push-button causes a count to be respectively added or substracted from the counter. A plurality of contacts is provided for each push-button contactor and these are mechanically ganged so that simultaneous operation of the various contacts occurs as each push-button is actuated. Other means may equally well be used to supply the input counts such as the contacts of a relay, for example. Also, although only three binary stages are shown in the form of the counter illustrated in Fig. 1, additional stages may be provided and connected in cascade to the three stages already shown in the manner in which the three stages shown are connected in Fig. 1.

When the counter is in its inactive or zero condition, all of the relays are dropped away. Means may be provided when desired to allow the counter to be restored to this zero condition at any time by merely including a normally closed contact in the common power supply connection to the counting relays so that opening of this normally closed contact causes all of the relays to drop away and thus be restored to their original condition.

Operation of the Add push-button contactor 14 when the counter is in its zero condition causes a circuit to be established from (+), through closed back contact 16 of the contactor 14, back contact 17 of relay AX1, and the upper winding of relay A1 to (−). When this relay picks up, a stick circuit is immediately established through its closed front contact 10 so as to maintain the upper winding energized.

Operation of this Add push-button contactor 14 caused front contact 18 to open so that relay AX1 can not at this time be operated. When the push-button contactor 14 is restored to its normal condition at the termination of the first input count, a circuit is completed from (+), through front contact 19 of the Subtract push button contactor 15, front contact 18 of the Add push button contactor 14, through front contact 20 of relay A1 and the center winding of relay AX1, to (−). As a result, relay AX1 picks up and a stick circuit is immediately established through front contact 12 to hold it in this condition. The condition of the various counting relays now corresponds to that shown in Fig. 2 for a count of one.

If another count is to be added to the counter, the closure of Add push button contactor 14 causes a circuit to be established from (+), through back contact 16 of the contactor 14, front contact 17 of relay AX1, front contact 11 of relay A1, and the lower winding of relay A1 to (−). As a result of this energization of the lower winding of relay A1, its armature is driven down to its released condition. As soon as relay A1 drops away, and while the push button contactor 14 is still depressed, a circuit is completed from (+), through back contact 21 of the contactor 14, front contact 22 of relay AX1, back contact 23 of relay A1, back contact 24 of relay AX2, and the upper winding of relay A2 to (−). Relay A2, therefore, picks up and is held up through the stick circuit completed through its closed front contact 25. When the Add push button contactor 14 is released at the end of the second input count, a circuit is again completed through the closed front contacts 19 and 18 in series of the push button contactors 15 and 14 respectively and through back contact 20 of relay A1, front contact 13 of relay AX1, and the lower winding of relay AX1 to (−). As a result, relay AX1 drops away. At the same time the closure of contacts 19 and 18 causes energy to be applied through front contact 26 of relay A2 and the center winding of relay AX2 to (−) so that the relay AX2 picks up. With the relays A1 and AX1 now both dropped away and the relays A2 and AX2 both picked up, the condition of the various counting relays corresponds to that indicated for a count of two in the code chart in Fig. 2.

If a third count is desired to be added to the two counts already registered on the binary counter of Fig. 1, the Add push button 14 is again actuated. This action results in energization of the upper winding of relay A1 in the same manner as described in connection with the reception of the first input count. When the Add push button contactor 14 is released at the end of the third input count, a circuit is completed through the closed front contacts 19 and 18 of the contactors 15 and 14 respectively and through front contact 20 of relay A1 to energize the center winding of relay AX1 so that this relay picks up. With relays A1, AX1, A2, and AX2 picked up, the various counting relays are in the conditions corresponding to a count of three as shown in Fig. 2.

When a fourth count is desired to be added to the count of three already applied to the counter, the Add contactor 14 is again actuated so as to cause the energization of the lower or drive-down winding of relay A1. When relay A1 drops away, a circuit is completed through the back contact 21 of contactor 14, front contact 22 of relay AX1, back contact 23 of relay A1, and front contact 24 of relay AX2, to the lower winding of relay A2, and then to (−). As a result of this energization of the lower winding of relay A2, this relay drops away. A similar circuit is then provided through the closed back contact 21 of contactor 14, through front contact 28 of relay AX2, back contact 29 of relay A2, back contact 30 of relay AX3, and the upper winding of relay A3 to (−). As a result, relay A3 picks up and is maintained energized by the stick circuit provided through closed front contact 31.

When the push button contactor 14 is restored to its original condition at the end of the fourth input count, energy again appears on wire 32 so that a circuit is completed through back contact 20 of relay A1 and front contact 13 of relay AX1 to energize the lower winding of relay AX1 and thereby cause this relay to drop away. The energization of wire 32 also results in a circuit being completed through back contact 26 of relay A2, front contact 33 of relay AX2, and lower winding of relay AX2 to cause this relay also to be driven down. Furthermore, energy is now also applied through front contact 34 of relay A3 to energize the center winding of relay AX3 and cause this relay to pick up. Thus, at the conclusion of the fourth input count, relays A1, AX1, A2, and AX2 are all dropped away, but relays A3 and AX3 are picked up in accordance with the code chart of Fig. 2.

From the description that has been given, it can readily be seen how the various counting relays are in general controlled as input counts are added to the counter. Actuation of the Add push button 14 each time results in operation of relay A1 from one condition to the other. Prior to the actuation of the Add push button 14, the relays A1 and AX1 are in step with each other. In other words, if the relay A1 is at that time picked up, the relay AX1 is also picked up, and if relay A1 is dropped away, relay AX1 is also dropped away. The condition of relay AX1 is thus used to control, though the position of contact 17 of this relay, the selective actuation of the upper or lower windings of relay A1 so that relay A1 will be picked up if it has been dropped away and will be driven to its dropped away condition if it has been picked up.

In a somewhat similar manner, the condition of relay A1 determines whether the pick-up or drive-down windings of relay AX1 will be energized. When the Add push button 14 is actuated so as to produce operation of relay A1, relay AX1 is prevented from being operated because its pick-up and drive-down circuits are opened by the opening of front contact 18 of the push button contactor A. However, when the push button contactor 14 is released so as to open the circuit which caused the actuation of relay A1, a circuit is completed to selectively energize either the center or lower winding of relay AX1 so that this relay may then repeat the condition of its associated relay A1.

When the second count is added to the counter and also on every second input count thereafter, the actuation of the Add push button contactor 14 causes relay A1 to drop away. When this occurs, a circuit is completed from (+), through back contact 21 of the push button contactor 14, front contact 22 of relay AX1, and back contact 23 of relay A1, to energize either the upper or lower winding of relay A2 depending upon whether relay AX2 is then picked up or dropped away.

As with the first binary stage, the relays A2 and AX2 are initially in the same condition when this input is applied to relay A2. If these relays are both dropped away, the upper or pick-up winding of relay A2 is energized through back contact 24 of relay AX2. If these relays A2 and AX2 are both in picked-up conditions, the lower or drive-down winding of relay A2 is energized through the front contact 24 of relay AX2. In this way, the input received from the first input stage causes the relay A2 of the second binary stage to be operated to its opposite condition. When the Add push button contactor 14 is released, energy is applied to the wire 32 and causes actuation of any of the relays AX1, AX2, or AX3 if they are then not in the same condition as their associated relays A1, A2, or A3, respectively.

The code chart of Fig. 2 shows, as already described, that for each successive count added to the counter there is a change in the condition of the relays of the first binary stage, and that the relays of any succeeding stage are operated to the opposite condition when a count is added only when such input count causes the upper of the two relays associated with any stage such as relays A2 and A3 to drop away. Since the relays A1 and AX1, of the first binary stage are operated to their opposite conditions when a single count is either to be added or subtracted from the total registered on the counter, actuation of the Subtract push-button 15 is effective to provide operation of relays A1 and AX1 in the same manner as described in connection with the addition of input counts.

Fig. 2 shows that the relays for the binary stages after the first are operated to their opposite conditions when a count is to be subtracted only when such count results in a picking up of the upper relay for the preceding stage such as the relays A1, A2, or A3. To cite a specific example of the manner in which a count is subtracted, it will be assumed that the counter of Fig. 1 has a total of four counts registered upon it. Fig. 2 shows that the relays of the first and second binary stages will, for a count of four, be all dropped away, but the relays A3 and AX3 for the third binary stage will both be picked up. If now the Subtract push-button contactor 15 is actuated for the purpose of subtracting a single count, the closure of back contact 35 will result in the establishment of a circuit from (+), through this closed back contact 35, closed back contact 17 of relay AX1, and the upper winding of relay A1, to (−). Relay A1 will then pick up and remain in this condition because of the stick circuit which is immediately established for it through the closed front contact 10.

Relay AX1 remains dropped away because of the open front contact 19 of the contactor 15. Consequently, the dropping away of relay A1 causes a circuit to be established from (+), through back contact 36 of the Subtract push-button contactor 15, back contact 37 of relay AX1, front contact 23 of relay A1, back contact 24 of relay AX2, and the upper winding of relay A2, to (−). Relay A2 also picks up, therefore, and the closure of its front contact 25 completes a stick circuit to maintain the upper winding energized.

With relay A2 picked up, a circuit is completed from (+), through back contact 36 of the contactor 15, back contact 33 of relay AX2, front contact 29 of relay A2, front contact 30 of relay AX3, front contact 39 of relay A3, and the lower winding of relay A3, to (−). Because of this energization of its lower winding, relay A3 drops away.

When the Subtract push-button 15 is released, the wire 32 is again energized because of the closed front contacts 13 and 19 of the push-button contactors 14 and 15. A circuit is, therefore, completed through front contact 20 of relay A1 and the center winding of relay AX1 to (−); through front contact 26 of relay A2 and the center winding of relay AX2 to (−); and through the back contact 34 of relay A3, front contact 40 of relay AX3, and the lower winding of relay AX3 to (−). Relays AX1 and AX2, with their center windings energized are immediately picked up and the stick circuits completed through their respective front contacts 10 and 25 result in energization of their upper windings which causes these relays to remain picked up. However, the energization applied to the lower winding of relay AX3 causes this relay to be dropped away. Consequently, the restoration of the Subtract push-button 15 results in all the relays being in the conditions corresponding to a count of three as shown in the code chart of Fig. 2.

When the counter registers a count of two, the relays of the first and third binary stages are all dropped away, but relays A2 and AX2 are picked up in accordance with the code chart. If the Subtract push-button 15 is then actuated for the purpose of subtracting a single count from the count of two, a circuit is completed from (+), and through the back contact 35 of the Subtract push-button 15, through back contact 17 of relay AX1, and the upper winding of relay A1, to (−) so that relay A1 picks up. When once picked up, the stick circuit including its front contact 10 maintains this relay in this picked up condition.

As soon as relay A1 picks up, a circuit is completed from (+) through back contact 36 of the Subtract push-button 15, back contact 37 of relay AX1, front contact 23 of relay A1, front contact 24 of relay AX2, and the front contact 41 of relay A2, through the lower winding of relay A2, and thus to (−). With its lower winding thus energized, relay A2 drops away. When relay A2 drops away, its front contact 29 opens, and a circuit can not be completed to energize either winding of relay A3. Relay A3, therefore, remains in its dropped away condition. When the Subtract push-button 15 is now released, energy is applied from (+), through front contact 19 of the Subtract push-button 15, front contact 18 of the Add push-button 14, front contact 20 of relay A1, and the center winding of relay AX1 to (−) so that relay AX1 picks up. The stick circuit for relay A1 which includes its front contact 12 is effective to hold this relay energized. At the same time, the energization now effective on wire 32 causes a circuit to be completed through back contact 26 of relay A2, front contact 33 of relay AX2, and the lower winding of the relay AX2, to (−) so that relay AX2 drops away. With relays A1 and AX1 now both picked up and all the remaining relays of the counter dropped away, the condition of the various counting relays for the different binary stages corresponds to the count of one as shown in the code chart of Fig. 2.

Merely for the purpose of illustrating one specific application of the counter of this invention, a number of lamps are shown and these are selectively illuminated to give a visual indication of the number of counts stored in the counter. When all of the counting relays are dropped away so that the counter is in its original or zero condition, a circuit is completed from (+), through back contact 45 of relay A1, back contact 46 of relay A2, back contact 47 of relay A3, and the filament of the lamp designated 0 (zero), to (−). When the counter registers a count of 3, the relays of the first two binary stages are picked up, while the relays of the last binary stage are dropped away. Under this condition, a circuit is completed from (+), through front contact 45 of relay A1, front contact 48 of relay A2, back contact 49 of relay A3, and the filament of the lamp designated 3, to (−). Similar circuits are provided to selectively illuminate a different lamp for each different count stored in the counter.

Having described a binary counter capable of both addition and subtraction and employing electromagnetic relays of the neutral-type, I desire it to be understood that the form shown and described has been selected merely to illustrate a specific embodiment of this invention without in any manner attempting to describe the actual construction and arrangement of parts that might be used in practice, and that various adaptations, modifications, and alterations may be applied to this specific form without in any manner departing from the spirit or scope of the invention.

What I claim is:

1. A binary type relay counter for both adding and subtracting input counts comprising, a plurality of binary stages each including a first and a second counting relay, each of said counting relays having separate pick-up and drive-down windings and means for holding said relay in its last actuated condition, add and subtract input circuit means being effective to energize one of said windings of said first relay of said first binary stage for each add or subtract input count, said add input means being effective to energize a winding of said first relay for each binary stage after the first in response to each input count only when said first relay of the immediately preceding stage is dropped away in response to said input count, said subtract input circuit means being effective to energize a winding of said first relay for each succeeding stage only when said first relay of the immediately preceding stage is picked up in response to said input count, said second relay of each binary stage being effective to select whether said pick-up or said drive-down winding of said associated first relay of said stage is to be energized in response to an input count to thereby cause said first relay to be operated to its opposite condition in response to said count, said add and subtract input circuit means also being effective to selectively energize said pick-up and drive-down windings of said second relay of each binary stage, said first relay of each binary stage selecting whether said pick-up or drive-down winding of said associated second relay of said stage is to be energized in response to an input count to thereby cause said second relay to be operated to the same condition as said first relay, said input circuit means being rendered ineffective to energize said windings of said second relays for the various binary stages while said windings of said first relays are being energized in response to an input count.

2. A relay binary counter for both adding and subtracting input counts comprising, a plurality of binary stages each including a first and a second electromagnetic relay and means associated with each relay to maintain said relay in its last actuated condition, energizing circuit means for said first relay of each stage governed by the second relay of said stage to operate said first relay to its opposite condition in response to an input count, energizing circuit means for said second relay of each binary stage governed by said first relay of said stage to operate said second relay to the same condition of said first relay of said stage, said energizing circuit means for said first relay of said first binary stage being made effective for each input count, said energizing circuit means for said first relay of each binary stage after the first being made effective in response to a count to be added only when said first relay of the preceding stage is dropped away and said second relay of said preceding stage is picked up, said energizing circuit means for said first relay of each binary stage after the first being made effective in response to a count to be subtracted only when said first relay of the immediately preceding binary stage is picked up and said second relay of said immediately preceding binary stage is dropped away, said energizing circuit means for said second relay of each binary stage being made ineffective while said energizing circuit means for said first relays of said binary stages is rendered effective in response to an input count.

3. An add-subtract binary counter comprising, a plurality of binary stages each comprising a first and a second electromagnetic relay, pick-up and drive-down circuit means associated with each relay for actuating said relay from one condition to the other, means for holding each of said relays in its last actuated condition, energizing circuit means for said first relay of each stage including a back contact of said second relay of said stage in series with said pick-up circuit means of said first relay and also including a front contact of said second relay in series with said drive-down circuit means of said first relay, energizing circuit means for said second relay of each stage including a front contact of said first relay in series with said pick-up circuit means of said second relay and also including a back contact of said first relay in series with said drive-down circuit means of said second relay, said energizing circuit means for said first relay of said first binary stage being made effective in response to each input count, said energizing means for said first relay of each binary stage after the first responding to an add input count only when said first relay of the immediately preceding binary stage is dropped away and said second relay of said preceding stage is picked up, said energizing means for said first relay of each binary stage after the first responding to a subtract input count only when said first relay of the immediately preceding binary stage is picked up and said second relay of said preceding binary stage is dropped away, said energizing circuit means for said second relay of each binary stage being rendered ineffective during the time that said energizing means of said associated first relay is rendered effective in response to an input count.

4. A relay binary counter for both adding and subtracting input counts comprising, a plurality of cascaded binary stages each including two neutral relays, separate add and subtract input circuit means common to all of said binary stages, pick-up and drive-down circuit means for the first relay of each of said stages being selectively energized in response to an input count in accordance with the condition of the associated second relay of said stage to thereby cause said first relay to be operated to a condition opposite that of said second relay, stick circuit means for each of said relays to maintain said relay energized when once picked up, said add and said subtract input circuit means each being effective in response to a respective add or subtract input count to operate said first relay of said first binary stage to its opposite condition, said add input circuit means being effective to operate the first relay of each binary stage after the first in response to an input count only when a particular out-of-correspondence condition exists between the first and second relays of the immediately preceding stage, said subtract input circuit means being effective to operate the first relay of each binary stage after the first in response to an input count only when the opposite out-of-correspondence condition exists between the first and second relays of the immediately preceding stage, said second relay of each binary stage being operated into correspondence with its associated first relay only during the interval between successive add or subtract input counts, whereby the operation of a plurality of binary stages occurs sequentially on selected input counts.

References Cited in the file of this patent

UNITED STATES PATENTS

| | | |
|---|---|---|
| 2,417,831 | Kinkead | Mar. 25, 1947 |
| 2,537,427 | Seid et al. | Jan. 9, 1951 |
| 2,606,236 | Oberman | Aug. 5, 1952 |
| 2,616,958 | Westerveld | Nov. 4, 1952 |

OTHER REFERENCES

Stabler: Reversible Binary Counter and Shaft Position Indicator; Technical Report #3; March 3, 1947.

Frost: Counting with Relays, AIEE Technical Paper 49-148; 1949.

Ritchie: Sequential Aspects of Relay Circuits, AIEE Technical Paper 49-146; 1949.